US012560987B2

(12) United States Patent

Lundgren et al.

(10) Patent No.: US 12,560,987 B2

(45) Date of Patent: Feb. 24, 2026

(54) COMBINED DATACENTER AND RACK THROTTLING

(71) Applicant: Google LLC, Mountain View, CA (US)

(72) Inventors: Peter Bruce Lundgren, Santa Clara, CA (US); Tianran Liang, Santa Clara, CA (US)

(73) Assignee: Google LLC, Mountain View, CA (US)

(*) Notice: Subject to any disclaimer, the term of this patent is extended or adjusted under 35 U.S.C. 154(b) by 60 days.

(21) Appl. No.: 18/223,200

(22) Filed: Jul. 18, 2023

(65) Prior Publication Data

US 2025/0028372 A1    Jan. 23, 2025

(51) Int. Cl.
*G06F 1/26* (2006.01)
*G06F 1/18* (2006.01)
*G06F 1/3206* (2019.01)
*G06F 1/3296* (2019.01)

(52) U.S. Cl.
CPC ............... *G06F 1/26* (2013.01); *G06F 1/189* (2013.01); *G06F 1/3206* (2013.01); *G06F 1/3296* (2013.01)

(58) Field of Classification Search
CPC .......... G06F 1/26; G06F 1/189; G06F 1/3296; G06F 1/3206
USPC ......................... 713/300, 310, 320, 330, 340
See application file for complete search history.

(56) References Cited

U.S. PATENT DOCUMENTS

| | | | |
|---|---|---|---|
| 7,062,933 B2 | 6/2006 | Burns et al. | |
| 7,707,443 B2 | 4/2010 | Chheda et al. | |
| 10,146,295 B2 | 12/2018 | Palmer et al. | |
| 10,509,456 B2 | 12/2019 | Lin et al. | |
| 11,126,255 B1 | 9/2021 | Sok et al. | |
| 2004/0117680 A1* | 6/2004 | Naffziger | G06F 1/324 |
| | | | 713/322 |
| 2010/0083007 A1 | 4/2010 | Howard et al. | |
| 2012/0049908 A1 | 3/2012 | Karlsson et al. | |
| 2013/0159744 A1 | 6/2013 | Gooding et al. | |

(Continued)

FOREIGN PATENT DOCUMENTS

| | | |
|---|---|---|
| CN | 116430977 A | 7/2023 |
| EP | 3879383 A1 | 9/2021 |

OTHER PUBLICATIONS

Extended European Search Report for EP Patent Application No. 23172817.1 dated Jan. 10, 2024. 14 pages.

(Continued)

*Primary Examiner* — Ji H Bae

(74) *Attorney, Agent, or Firm* — Lerner David LLP

(57) ABSTRACT

The technology is generally directed to a power throttling mechanism controlled by a payload receiving power provided by a rack, or other such power source. The power level provided by the rack may be maintained for a predetermined period of time. The power throttling mechanism may include the payload determining the predetermined period of time and a throttling offset. The payload may execute the power throttling by adjusting a voltage reference based on the throttling offset, after which the payload may maintain power usage for at least the predetermined period of time. According to some examples, in addition to throttling power for a payload, power capping may occur at substantially the same time. A power capping mechanism may transmit a notification to a controller, such as a baseboard management controller, to cap the power consumption of the datacenter.

17 Claims, 10 Drawing Sheets

(56)                References Cited

U.S. PATENT DOCUMENTS

| | | |
|---|---|---|
| 2014/0321014 A1 | 10/2014 | Chen et al. |
| 2015/0169026 A1 | 6/2015 | Bodas et al. |
| 2016/0127262 A1 | 5/2016 | Lawrence, III |
| 2016/0268801 A1* | 9/2016 | Chong ................... G06F 1/263 |
| 2021/0302039 A1 | 9/2021 | Atchison et al. |
| 2021/0405729 A1 | 12/2021 | Abou-Alfotouh et al. |
| 2022/0253120 A1* | 8/2022 | Rapaka ................... G06F 1/324 |
| 2024/0094799 A1* | 3/2024 | Li .......................... G06F 1/3206 |
| 2024/0361365 A1* | 10/2024 | Zhang ............... G01R 19/16552 |

OTHER PUBLICATIONS

Pelley et al., "Power Routing: Dynamic Power Provisioning in the Data Center", ASPLOS'10, Mar. 13-17, 2010, 12 pages.
Extended European Search Report for European Patent Application No. 24189168.8 dated Dec. 23, 2024. 10 pages.

* cited by examiner

810    Detect an input voltage

820    Determine, based on the detected input voltage, a reduction in input voltage 830    Determine, based on the reduction in input voltage, at least one throttling offset 840    Adjust, based on the determined throttling offset, a voltage reference

COMBINED DATACENTER AND RACK THROTTLING

BACKGROUND

The power output of a rack in a server system is relatively consistent, typically fluctuating a small amount based on the payload of the rack. For instance, at a typical payload, the power output of a rack may be up to 10 kW as the amount of power drawn by the payloads increases. The amount of power continuously provided by the rack may be limited to 10 kw, but the rack power components and distribution may support higher power for short time periods. The typical power consumption of a server is often less than the maximum possible power consumption of the server. Building and supplying a datacenter to maximize power output to every server is expensive. Further, maximizing the power capacity to each server can cause the servers to cross the power limits. This can result in servers, racks, and/or other such components of a datacenter becoming overloaded or short-circuiting, which can lead to damaged components, lost data, or fires.

BRIEF SUMMARY

The technology is generally directed to a power throttling mechanism controlled by a payload receiving power provided by a rack or other such power source. The power level provided by the rack may be maintained for a predetermined period of time. The power throttling mechanism may include the payload determining the predetermined period of time and a throttling offset. The payload may execute the power throttling by adjusting a voltage reference based on the throttling offset, after which the payload may maintain power usage for at least the predetermined period of time. By throttling the power consumption of the payload for at least the predetermined period of time the power available to the payload is sustained for at least the predetermined period of time, so the payload has sufficient time to backup data before shutting down. According to some examples, in addition to throttling power for a payload, power capping may occur at substantially the same time. A power capping mechanism may transmit a notification to a controller, such as a baseboard management controller, to cap the power consumption of the datacenter.

One aspect of the disclosure is directed to a method, comprising detecting, by one or more processors of a first payload, an input voltage, determining, by the one or more processors based on the detected input voltage, a reduction in input voltage, determining, by the one or more processors based on the reduction in input voltage, at least one throttling offset, and adjusting, by the one or more processors based on the determined throttling offset, a voltage reference.

The method may further comprise latching, by the one or more processors, power throttling for a latch period. The latch period may be based on a power supply of a rack providing the input voltage to the first payload and corresponds to a predetermined period of time.

Adjusting the voltage reference, the method may further comprise decreasing, by the one or more processors, power consumption of the first payload.

The at least one throttling offset may be determined by a sequencer. The method may further comprise selecting, by the one or more processors, one of the at least one throttling offset. The at least one throttling offset may be determined by a voltage divider.

The reduction in input voltage may correspond to a throttling signal. The method may further comprise transmitting, by the one or more processors, the throttling signal to a software control loop.

The voltage reference may monitored by a pulse-width modulator ("PWM") controller.

The method may further comprise throttling, by the one or more processors based on the voltage reference, power consumption of the first payload.

Another aspect of the disclosure is directed to a system, comprising one or more processors. The one or more processors may be configured to detect an input voltage provided to a payload, determine, based on the input voltage, a reduction in input voltage, determine, based on the reduction in input voltage, a throttling offset, and adjust, based on the determined throttling offset, a voltage reference.

Yet another aspect of the disclosure is directed to one or more non-transitory computer-readable storage media encoding instructions that, when executed by one or more processors of a payload, cause the one or more processors to perform operations comprising detecting an input voltage, determining a reduction in input voltage, determining, based on the reduction in input voltage, at least one throttling offset, and adjusting, based on the determined throttling offset, a voltage reference.

DETAILED DESCRIPTION

Figure 1:
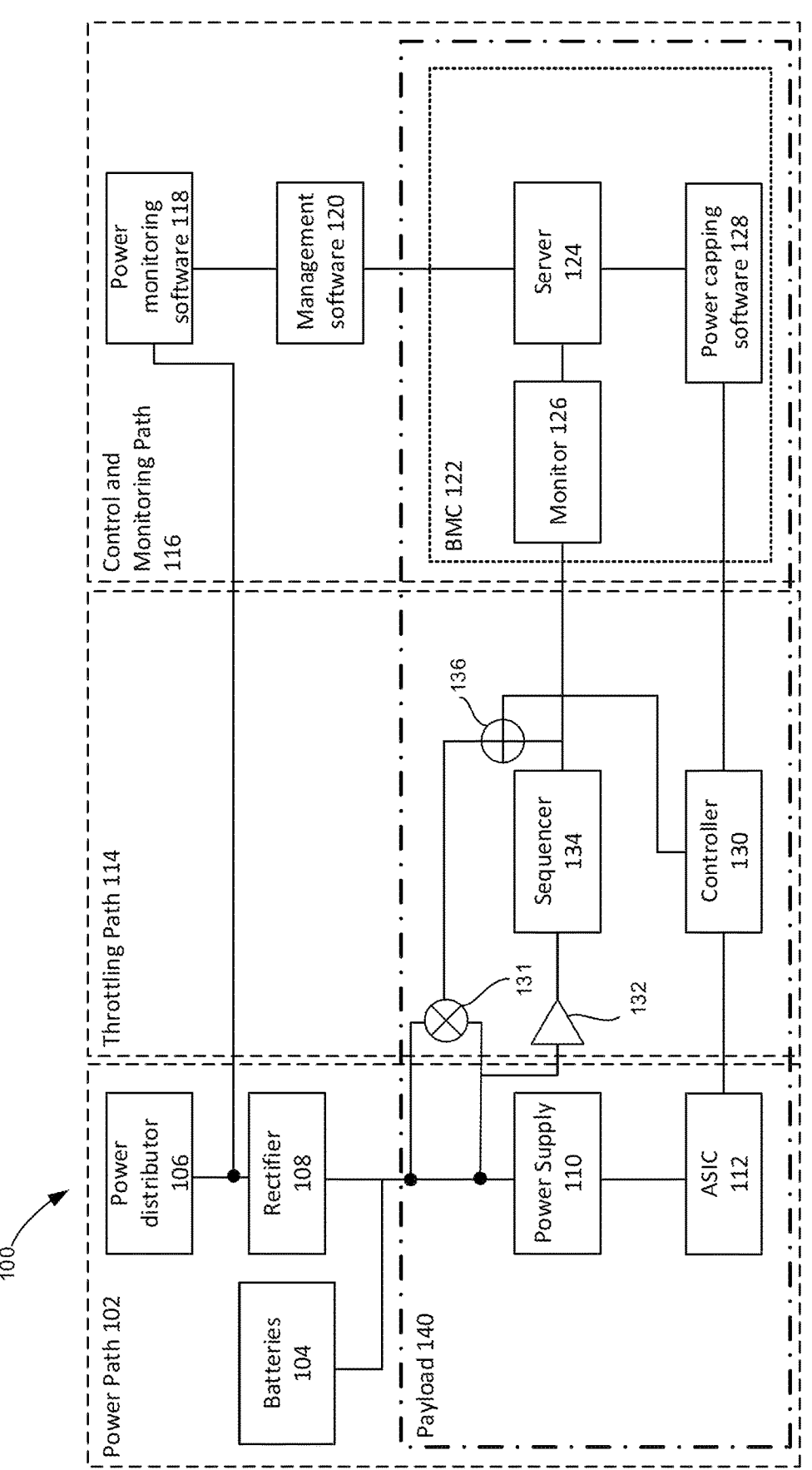
FIG. 1 is a schematic diagram of a power throttling system in accordance with aspects of the disclosure.

The technology is generally directed to a power throttling mechanism controlled by a payload receiving power provided by a rack, or other such power source. The power level provided by the rack may be maintained for a predetermined period of time. The power throttling mechanism may include the payload determining the predetermined period of time and a throttling offset. The payload may execute the power throttling by adjusting a voltage reference based on the throttling offset, after which the payload may maintain power usage for at least the predetermined period of time. By throttling the power consumption of the payload for at least the predetermined period of time, the power available to the payload is sustained for at least the predetermined period of time, so the payload has sufficient time to backup data before shutting down.

The system may include a rack and one or more payloads in communication with the rack. The rack may include a rectifier configured to output voltage to the payloads. The output voltage of the rectifier may be the input voltage to the payload. The payloads may be, for example, one or more trays within the rack. The payloads may include a digital controller, a power supply, a sequencer, one or more processors, and other such computing components.

The payloads may detect voltage being received from the rectifier of the rack. When the power consumption of the payloads exceeds a threshold amount of power for a predetermined period of time, the rectifiers may generate a throttling signal. The threshold amount of power may be a percentage of the total available power or a predetermined value. The throttling signal may be a reduction in output voltage from the rectifier.

In instances where the throttling signal is a reduction in output voltage from the rectifier, the payloads may detect a reduction in input voltage. The payloads may determine that the reduction in input voltage is a throttling signal. In some examples, after detecting the throttling signal, the sequencer may latch the throttling signal for a predetermined period of time such that the power used by the payload is reduced. Latching the throttling signal may cause the throttling signal to be active for the predetermined period of time. The predetermined period of time may be, for example, a latch period. The latch period may remain until the predetermined period of time is over or another control signal allows the latched throttling signal to change.

The cause of the throttling signal may be unknown. In some examples, the throttling signal may be induced by the rectifiers exceeding a threshold capacity. In another example, the throttling signal may be induced by converting to battery power. To maximize the amount of time the payload can continue to consume power, the throttling signal may be latched for a predetermined period of time. The predetermined period of time may be based on the battery capacity. In some examples, the predetermined period of time may be selected such that battery capacity is not exceeded.

In some examples, the throttling signal may be detected by a comparator in the payload and transmitted to the sequencer in the payload. Transmitting the throttling signal to the sequencer provides flexibility in adjusting the latch period, e.g., the predetermined period of time, without having to include additional components within the tray. In some examples, by transmitting the throttling signal to the sequencer, a delay may be added before throttling power consumption. For example, the sequencer may delay throttling power consumption by the payload by a threshold period of time. Delaying throttling power consumption of the payload by the threshold period of time may provide for the rectifiers to reestablish power, for the power consumption to normalize on its own, or the like before ever throttling power consumption.

The latch period, along with a throttling offset, may be transmitted to the digital controller of the payload. According to some examples, an offset function may be used to determine a throttling offset. The throttling offset may be used to add a preset voltage to the voltage sense input of a pulse-width modulator ("PWM") controller. The PWM controller may adjust the output PWM to throttle the power consumption of the payload. For example, the throttling offset may cause the PWM controller to determine that the payload is consuming more power than the payload actually is.

As one example, if the processors of the payload are configured with a target power of 500 W, and the actual power consumption was 450 W, the processors may increase, or turn up, the PWM controller in order to increase the power consumption of the payload. In some examples, if the actual power consumption was 550 W and the target power was 500 W, the processors may decrease, or turn down, the PWM controller to decrease the power consumption of the payload. In some examples, the increase or decrease of the PWM controller may be determined based on the throttling offset.

According to some examples, the throttling signal may be transmitted to a software control loop. The software control loop may be, for example, a baseboard management controller ("BMC"). The BMC may monitor the power consumption and/or power throttling of the payload. According to some examples, the BMC may be in communication with both the payload and the rack such that the BMC can respond to datacenter level software signals as well as signals from the payload.

According to some examples, in addition to throttling power for a payload, the system may be configured to cap power. The power capping mechanism may be managed by datacenter software while the power throttling of the payload may be managed by the hardware within the rack. The power capping may occur at substantially the same time as the power throttling of the payload. Power capping may occur when the power consumption of the datacenter approaches breaker limits. When the power consumption approaches breaker limits, the power capping mechanism may transmit a notification to BMC to cap the power consumption of the datacenter. The BMC may transmit a command to the PWM controller of the payload to reduce the power supplied to the payload. The reduction in power supplied to the payload may decrease the overall power consumption of the datacenter.

By adjusting the reference voltage input to the PWM controller, the payload may respond to the throttling signal in the order of milliseconds, rather than the order of seconds if the reference voltage was adjusted in the software of the payload. Using the hardware components within the payload to create a control loop allows for the control loop to be a fast control loop, e.g., capable of responding to the throttling signal in the order of milliseconds.

Adjusting the voltage reference based on the throttling offset may cause the digital controller of the payload to reduce the power consumption, thereby extending the amount of time the payload can continue to operate in the event of a power event. In some examples, by adjusting the voltage reference, the payload may continue to operate for at least the predetermined latch period. This may allow for the power event, such as a power outage, to be restored. In some examples, this may allow for the payload to backup any data or functions before shutting down.

In some examples, by throttling the power supplied to the payloads, the datacenter may be able to oversubscribe power and, therefore, lower infrastructure costs associated with running the datacenter. For example, as the power consumption of the datacenter approaches breaker limits, the datacenter software may transmit a throttle power request. The request may be received by the BMC. According to some examples, as the BMC can communicate with both the datacenter and the payloads, the BMC may determine a power cap and communicate the power cap with the PWM controller of the payload.

FIG. 1 is a schematic diagram of a power throttling system 100. The power throttling system 100 may include a power path 102, throttling path 114, and control and monitoring path 116. The system 100 may include a payload 140. The system 100 may be part of a datacenter, a rack within a datacenter, or the like. According to one example, the system 100 may be a rack within a datacenter and the payload 140 may be a server within the rack.

Power path 102 may include a power system of the datacenter and/or rack within the datacenter. For example, power path 102 may include a power distributor 106, one or more rectifiers 108, and one or more batteries 104. According to some examples, power path 102 may include power system features of payload 140. For example, within power path 102, the payload 140 may include power supply 110 and one or more application specific integrated circuits ("ASIC") 112.

The throttling path 114 may include multiplier 131, comparator 132, sequencer 134, offset function 136, and controller 130. The multiplier 131 may be an analog multiplier configured to determine power based on the voltage and current of the system, e.g., by multiplying the voltage by the current. Multiplier 131, comparator 132, sequencer 134, offset function 136, and controller 130 may be part of payload 140. The payload 140 may include other such computer in addition to and/or instead of those illustrated in FIG. 1.

The control and monitoring path 116 may include power monitoring software 118 and management software 120. The power monitoring software 118 may be, for example, datacenter power monitoring software. The management software 120 may be, for example, machine management software. According to some examples, the power consumption of the system 100 may be monitored. For example, datacenters may oversubscribe power to lower infrastructure costs. To safely and effectively oversubscribe power, the payload may be actively reduced if breaker limits are approached. The control and monitoring path 116 may further include baseboard management controller ("BMC") 122. The BMC 122 may include server 124, power capping software 128, and monitor 126. In some examples, server 124 may be a Redfish server. According to some examples, the monitor 126 may be a general-purpose input/output ("GPIO") monitor. The BMC 122 may be part of payload 140. According to some examples, the BMC 122 may be a software control loop. The BMC 122 may monitor the power consumption and/or power throttling of the payload 140. According to some examples, the BMC 122 may be in communication with both the payload 140 and the rack such that the BMC 122 can respond to datacenter level software signals as well as signals from the payload 140. The signals may be, in some examples, throttling signals.

Figure 2:
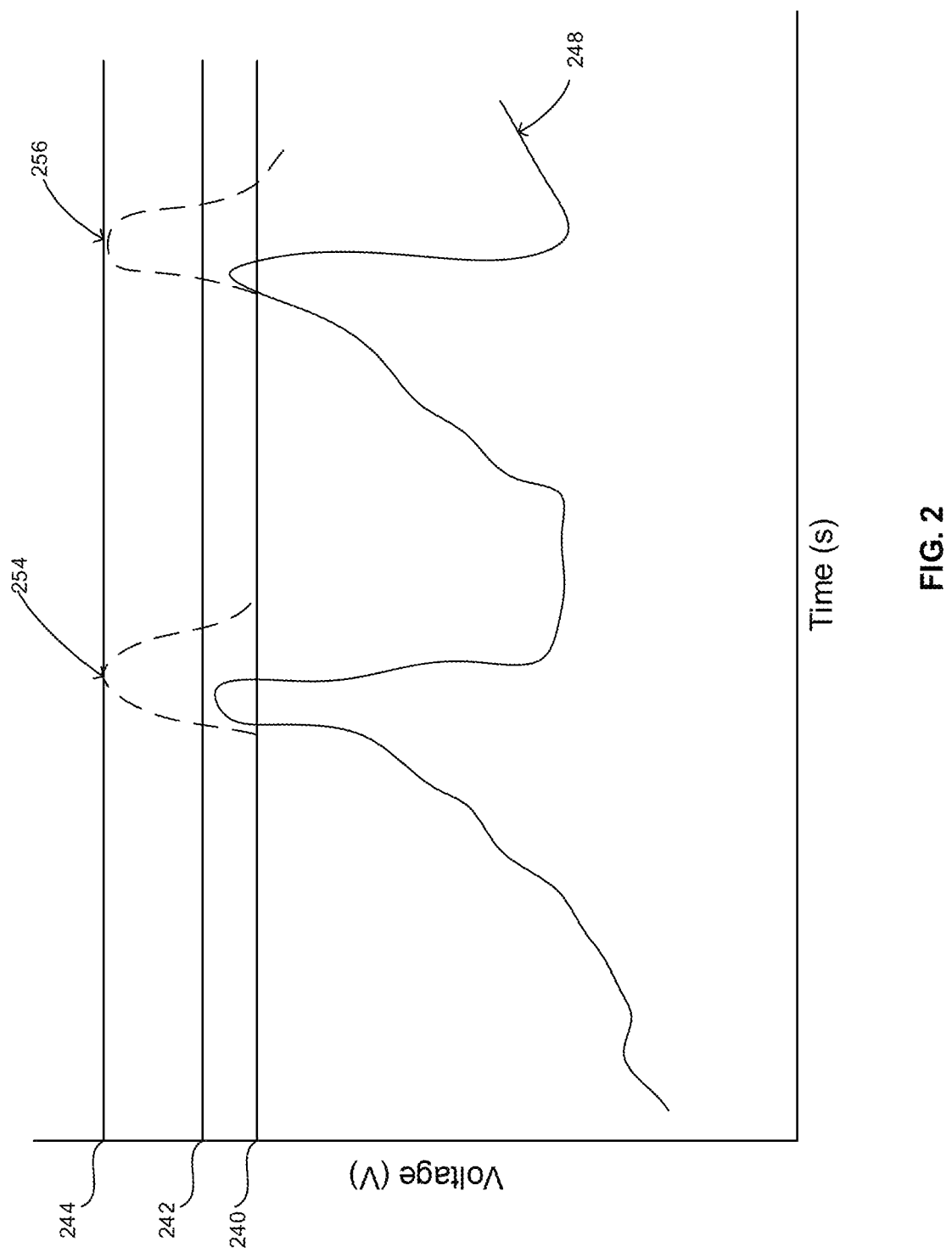
FIG. 2 is a graphical representation of power oversubscription in accordance with aspects of the disclosure.

Referring to FIG. 2, as the power payload 248 of the datacenter approaches the breaker limit 242, the payload 248 may be reduced. For example, the payload 248 may exceed the power capping threshold 240 and approach the breaker limit 242. If the payload 248 of the datacenter is not reduced, the payload 248 will spike 254, 256 to the subscription limit 244. When the payload 248 is between the breaker limit 242 and the subscription limit 244, the datacenter power is oversubscribed.

Referring back to FIG. 1, to reduce the power payload of the datacenter, the power monitoring software 118 may transmit a request to the management software 120 to throttle power. The power monitoring software 118 and/or management software 120 may be, in some examples, software within system 100. The request to throttle power may be, in some examples, software application programming interface ("API"). Throttling power may, in some examples, be a reduction in power consumption by payload 140, as compared to disruptively halting jobs.

The BMC 122 may receive the power throttle request from management software 120. The BMC 122 may be, in some examples, software within payload 140. According to some examples, the management software 120 may transmit the request to server 124. The request may be software API. In some examples, the management software 120 may transmit a power limit to server 124. Based on the power limit, server 124 may transmit a power capping command to power capping software 128. The power capping software 128 may transmit a voltage command to the controller 130. The voltage command may be, in some examples, a digital signal transmitted from the power capping software 128 to the controller 130. Based on the voltage command transmitted by the power capping software 128, the controller 130 may adjust the power consumption of payload 140. For example, the power consumption of payload 140 may be reduced. Reducing the power consumption of payload 140 may, in some examples, reduce the power consumption of the datacenter.

According to some examples, by throttling the power supplied to the payloads, the datacenter may be able to oversubscribe power. The oversubscription of power may reduce infrastructure costs associated with running the datacenter.

The power capping mechanism may be managed by datacenter software while the power throttling of the payload 140 may be managed by the hardware within the rack. The power capping may occur at substantially the same time as the power throttling of the payload 140.

According to some examples, the rack within the datacenter may oversubscribe power simultaneously and/or in addition to the datacenter oversubscribing power. According to some examples, rack power oversubscription may be more local and time-sensitive than datacenter power oversubscription. In some examples, the power throttling for the rack must happen in less than about 15 ms.

Figure 3:
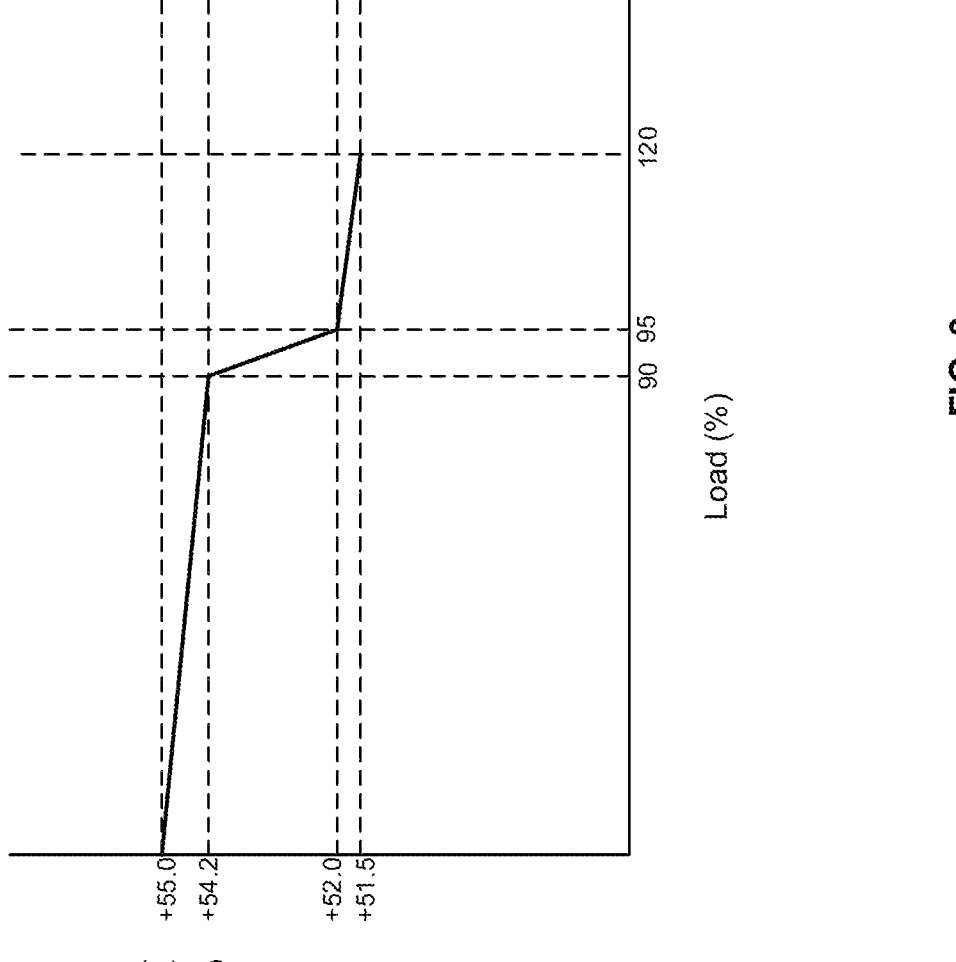
FIG. 3 is a graphical representation of output voltage of a power source in accordance with aspects of the disclosure.

As graphically illustrated in FIG. 3, the DC bus bar of the rack, e.g., the rectifier 108 of the rack, may be configured to output up to at least 55V. The output voltage of the rectifier 108 may decrease as the payload power consumption increases. For example, when on rectifier power, the rectifier may output a voltage of 52V when the payload is at 95% capacity. The DC bus voltage may drop below 52V when the payload capacity increases and/or when there is a power event. The power event may include, for example, a power outage. In examples where there is a power event, the battery power may provide an output voltage of about 51V or less.

Referring back to FIG. 1, the reduction in output voltage from the rectifiers 108 may be a throttling signal. The throttling signal may be detected by comparator 132 and transmitted to sequencer 134. The throttling signal detected by comparator 132 may be an analog signal. The comparator 132 may be, in some examples, hardware within payload 140. The throttling signal transmitted from comparator 132 to sequencer 134 may be a digital signal. The sequencer 134 may be hardware within the payload 140. Transmitting the throttling signal to the sequencer 134 provides flexibility in adjusting a latch period, without having to include additional components within the tray. The latch period may be, for example, a predetermined period of time based on the battery 104 capacity. In some examples, the predetermined period of time may be selected such that battery 104 capacity is not exceeded. The latch period may maximize the amount of time the payload 140 can continue to consume power.

In some examples, by transmitting the throttling signal to the sequencer 134, a delay may be added before throttling power consumption. For example, the sequencer 134 may delay throttling power consumption by the payload 140 for a threshold period of time. Delaying throttling power consumption of the payload 140 by the threshold period of time may provide for the rectifiers 108 to reestablish power, for the power consumption to normalize on its own, or the like before ever throttling power consumption.

According to some examples, the throttling signal may be transmitted from the sequencer 134 to the BMC 122. For example, the throttling signal may be transmitted to the monitor 126 for monitoring. The throttling signal transmitted to the monitor 126 may be a digital signal. The monitor 126 may monitor the power consumption and/or power throttling of the payload 140.

The latch period along with a throttling offset may be transmitted to a controller 130. The throttling offset may be, in some examples, an analog signal. The controller 130 may be hardware within payload 140. The controller may be, in some examples, a digital controller, a pulse-width modulator ("PWM") controller, or the like. The throttling offset may be determined by an offset function 136. In some examples, the offset function 136 may be used to add a preset voltage to the voltage sense input of the controller 130. The controller 130 may adjust the output to throttle power consumption of the payload 140. For example, if the controller 130 is a PWM controller, the PWM controller may adjust the output PWM to throttle the power consumption of the payload 140. Throttling the power consumption of the payload 140 may reduce the power consumption of the payload 140, which may, in some examples, extend the amount of time the payload 140 can continue to operate in the event of a power event. According to some examples, adjusting the voltage reference may allow for the payload 140 to continue to operate for at least the latch period. This may allow for the power event, such as a power outage, to be restored, for the payload 140 to backup any data or functions before shutting down, or the like.

In some examples, the throttling offset may cause the controller 130 to determine that the payload 140 is consuming more power than the payload 140 is. As one example, if the processors of the payload 140 are configured with a target power of 525 W, and the actual power consumption was 485 W, the processors of payload 140 may increase, or turn up, the controller 130 to increase the power consumption of the payload 140. In some examples, if the actual power consumption was 595 W and the target power was 550 W, the processors of the payload 140 may decrease, or turn down, the controller 130 to decrease the power consumption of the payload 140. In some examples, the increase or decrease of the controller 130 may be determined based on the throttling offset.

By increasing or decreasing the reference voltage input to the controller 130, the payload 140 may respond to the throttling signal detected by the comparator 132 with a response time on the order of milliseconds, rather than of seconds, if the reference voltage was adjusted in the software of the payload 140. The software of payload 140 may be, for example, the BMC 122. The power supply 110, comparator 132, sequencer 134, offset function 136, controller 130, and ASIC 112 may be hardware components within the payload 140. Using the hardware components within the payload 140 to create a control loop allows for the control loop within payload 140 to be a fast control loop, e.g., able to respond to the throttling signal with a response time on the order of milliseconds.

Figure 4A:
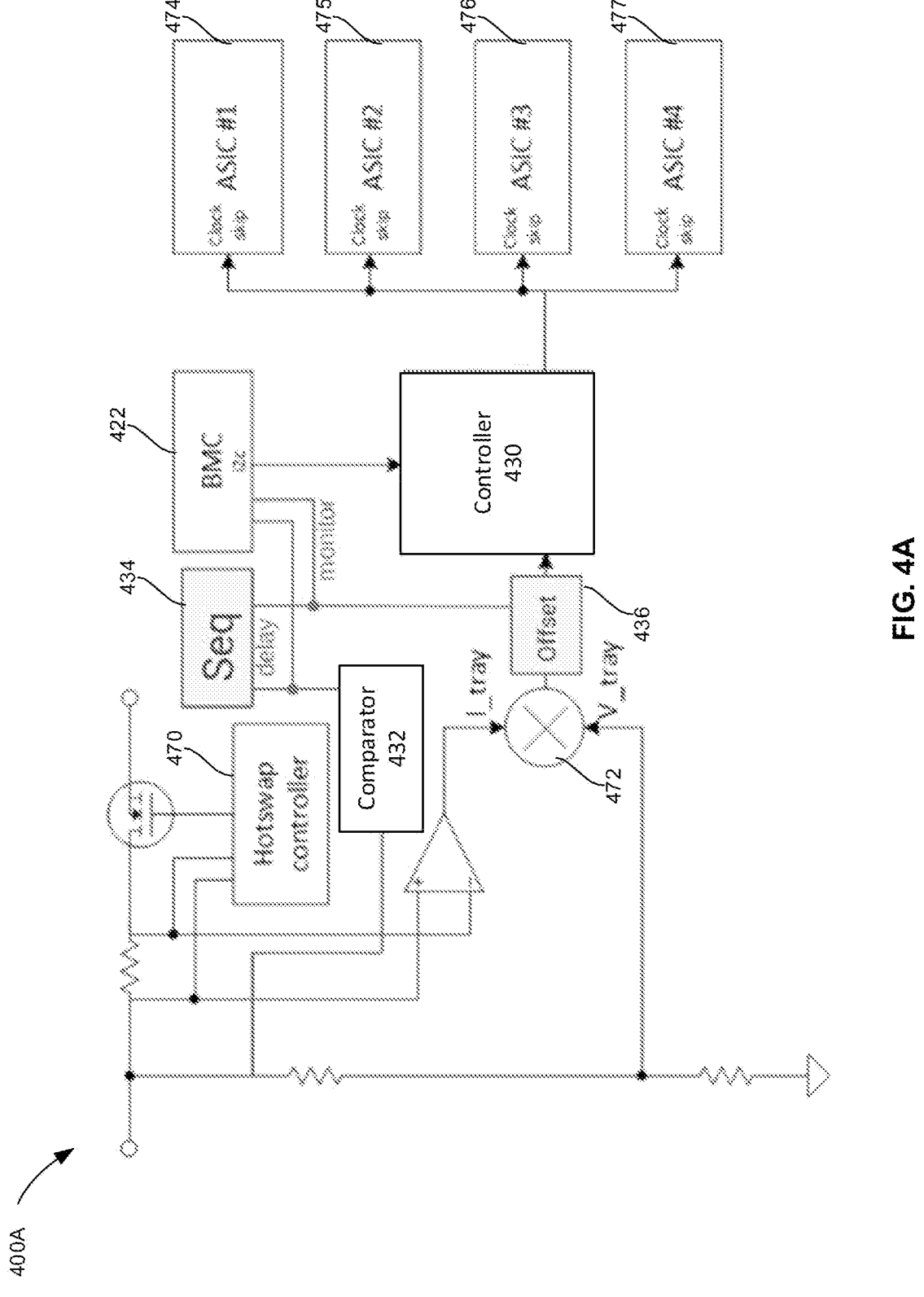
FIG. 4A is a circuit diagram of a portion of a power throttling system in accordance with aspects of the disclosure.

FIG. 4A illustrates an example circuit diagram of a portion of the payload. As shown, a circuit 400A may include a hot swap controller 470, comparator 432, sequencer 434, BMC 422, controller 430, offset function 436, analog multiplier 472, and ASICs 474-477. Multiplier 472 may be similar to multiplier 131, comparator 432 may be similar to comparator 132, sequencer 434 may be similar to sequencer 134, BMC 422 may be similar to BMC 122, controller 430 may be similar to controller 130, and offset function 436 may be similar to offset function 136.

The comparator 432 may detect the decrease in input voltage. In some examples, the decrease in input voltage may be a throttling signal. The comparator 432 may be a high precision comparator. The high precision comparator may be configured to detect a voltage change of approximately 4% and, in some examples, may account for resistor divider accuracy.

The BMC 422 may be configured to periodically sample the state of the rack level power throttling for logging and alerting. The sampling may be at a frequency that allows the system 100 of FIG. 1 to detect and triage a slow-performing rack to determine that rack-level power capping is occurring on that rack.

The sequencer 434 may be configured to transmit the throttling signal. The throttling signal may be a digital signal. In some examples, the sequencer 434 may be configured to revert the polarity of the signal, apply one or more filters, add a delay, or the like. According to some examples, the sequencer 434 may be a filter configured to remove short time glitches. The offset function 436 may be configured to determine the throttling offset. The throttling offset may be used to add a preset voltage to the output of multiplier 472. Adding a preset voltage to the output of multiple 472 may cause the system 100 of FIG. 1 to respond as if the voltage reference of controller 430 was adjusted. As shown in FIG. 4A, the offset function 436 may be a separate component from the multiplier 472. In some examples, such as in the circuit 400A as shown in the circuit diagram of FIG. 4B, the multiplier 472 may include the offset function.

Figure 4B:
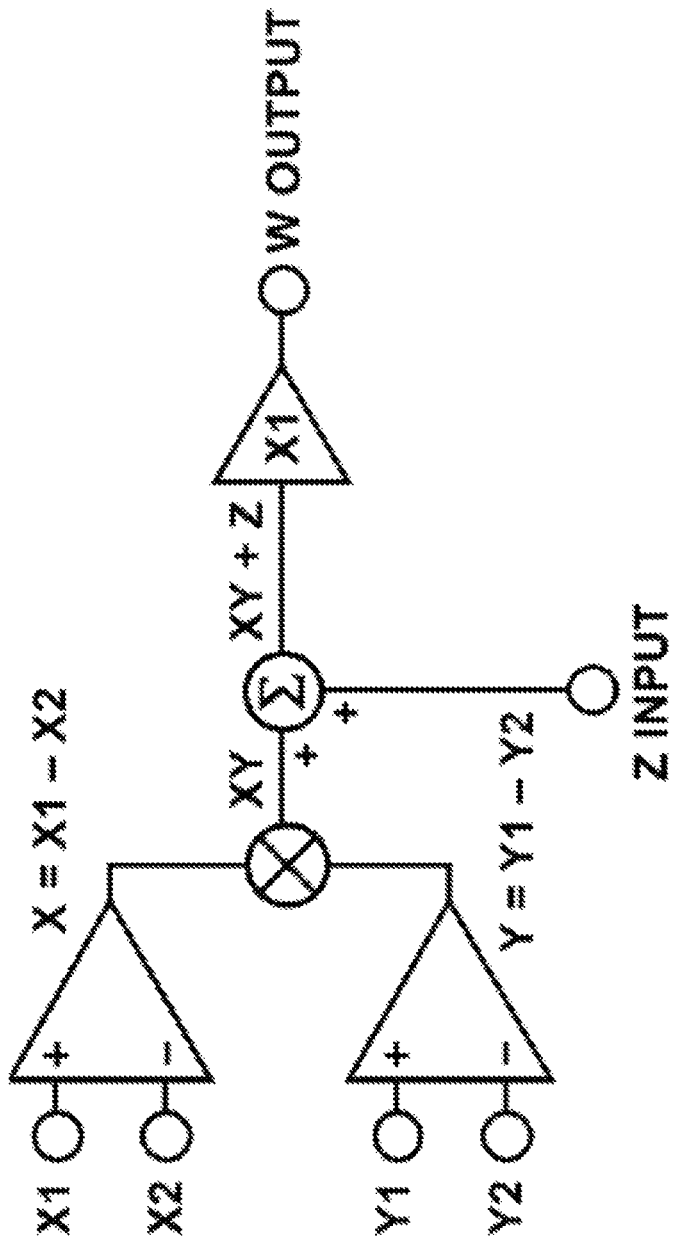
FIG. 4B is a circuit diagram of a sequencer in accordance with aspects of the disclosure.

As shown in FIG. 4B, the sequencer may output to Z input. The throttle offset may be determined based on the resistor divided sequencer output to Z input. According to some examples, the throttle amount may be a predetermined amount based on the resistor divider. Adjusting the throttle amount may include reprogramming a voltage regulator between the sequencer and Z input. According to some examples, the voltage regulator may be a low dropout regulator.

Referring back to FIG. 4A, the throttling offset may be transmitted to the controller 430. The throttling offset may be used to add a preset voltage to the voltage sense input of the controller 430. The controller 430 may be a PWM controller. The controller 430 may adjust the output, e.g., PWM, to throttle the power consumption of the payload. The adjusted output may be transmitted to ASICs 474-477.

Figure 5A:
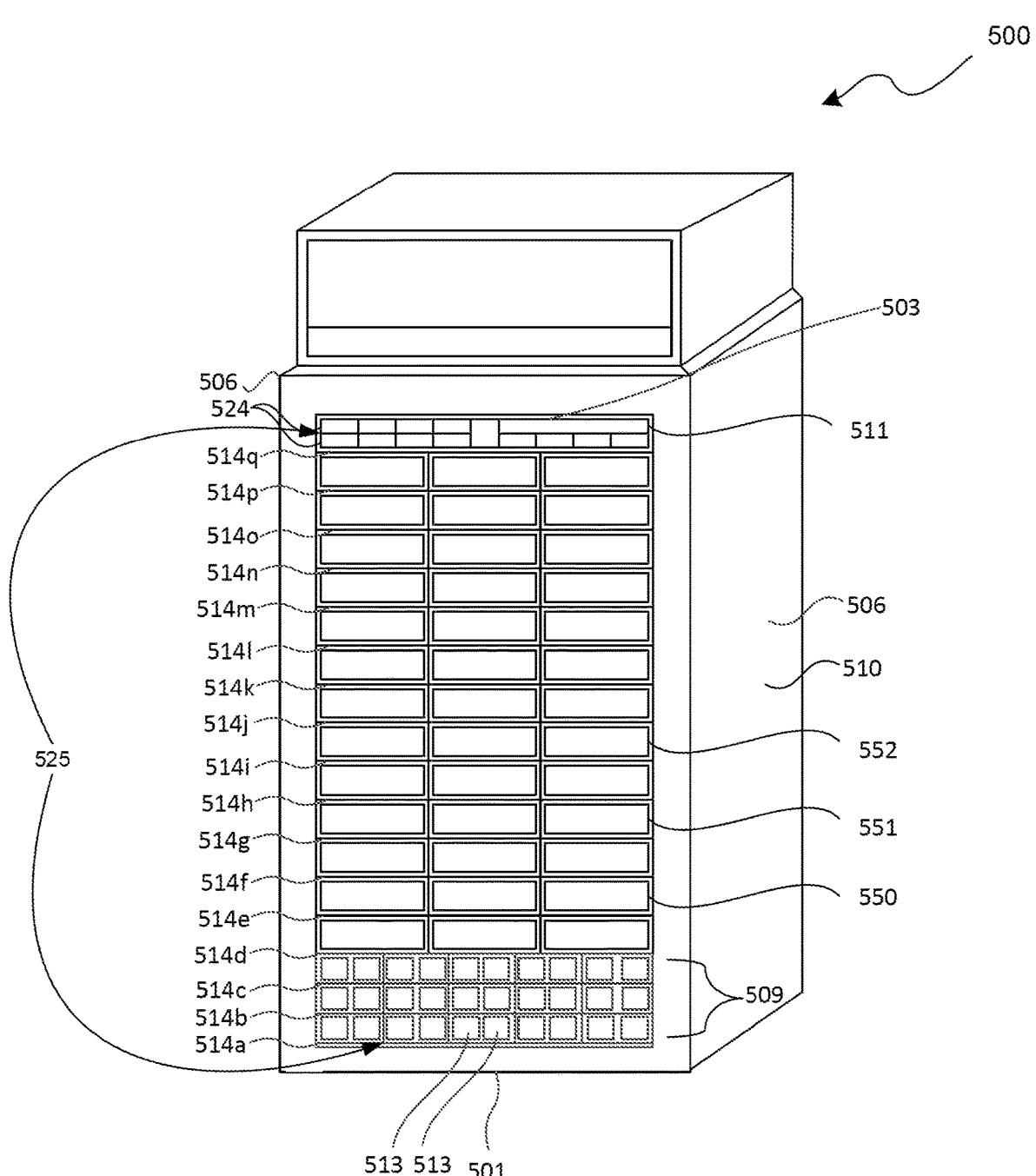
FIG. 5A is a perspective view of a rack in accordance with aspects of the disclosure.
Figure 5B:
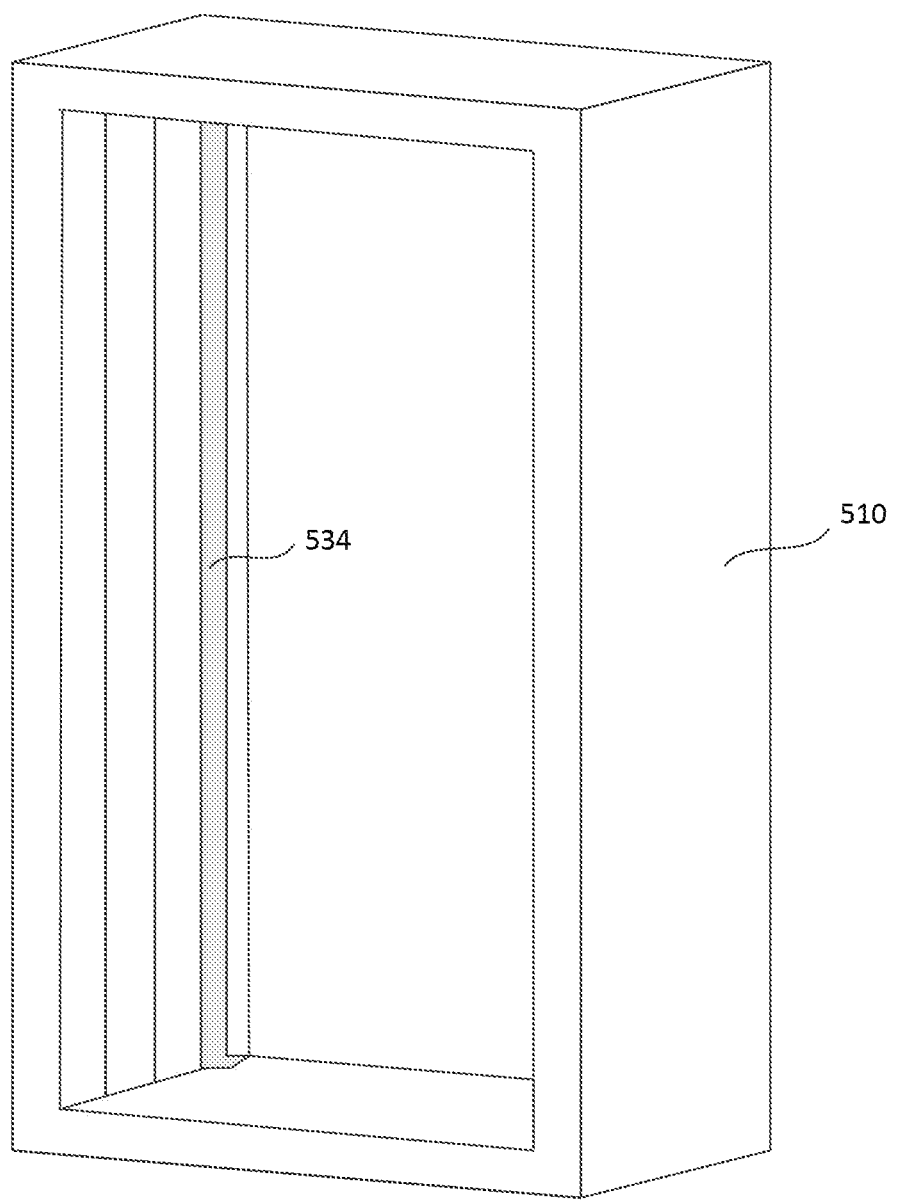
FIG. 5B is another perspective view of the rack of FIG. 4A in accordance with aspects of the disclosure.

FIGS. 5A and 5B show examples of a server system 500. FIG. 5A depicts server system 500 that may include a datacenter rack 510 having a floor 501, a ceiling 503, sidewalls 506, a plurality of shelves 514a-514q for holding payloads, a rack monitoring unit ("RMU") 511 for monitoring the status of the features to the rack, a plurality of payloads 550-552, and a power system 525 including a plurality of rectifiers 524 and a battery backup 509, including battery units 513.

In one example, payload 550 may be a dedicated storage device, for example, including any type of memory capable of storing information accessible by a processor, such as a hard-drive, memory card, ROM, RAM, DVD, CD-ROM, or solid state memory. In another example, payload 551 may be a preprogrammed payload which draws power from the main bus bar in order to test the operation of the system 500. According to some examples, one or more payloads 550-552 may be trays. Additionally or alternatively, payloads 550-552 may be any device that generates a load. In some examples, payloads 550-552 may be any device that consumes power.

FIG. 5B is an example of rack 510 without shelves 514a-514q. In FIG. 5B, it can be seen that the rack 510 includes a main bus bar 534. The main bus bar 534 may be connected to each shelf 514a-514q of the rack 510 to provide power and data to the payloads.

Figure 6:
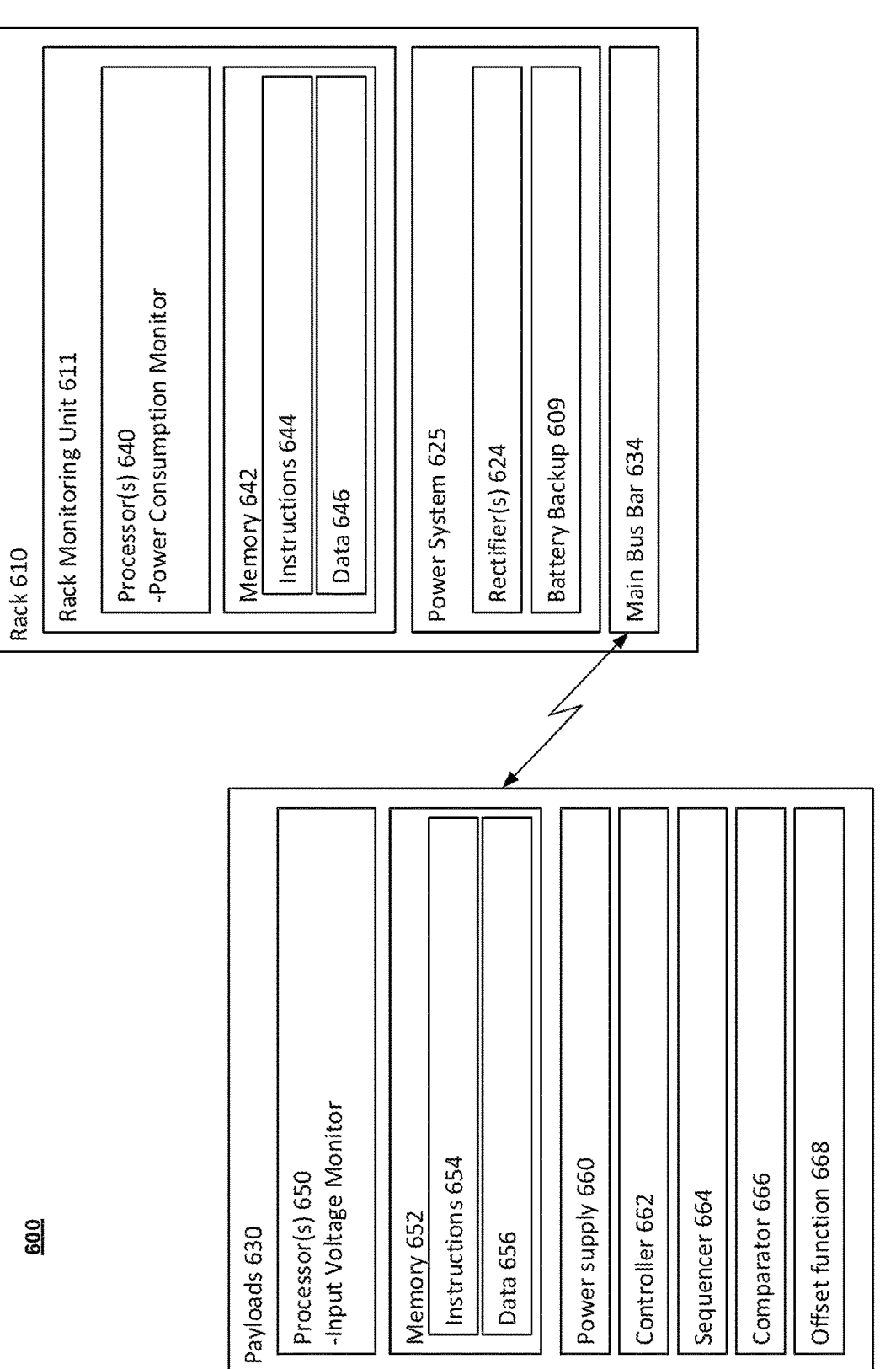
FIG. 6 is a schematic diagram of an example power architecture in accordance with aspects of the disclosure.

FIG. 6 illustrates an example system 600 in which the features described above and herein may be implemented. While a number of components are shown, such components are merely non-limiting examples and other components may additionally or alternatively be included. The figures should not be considered limiting the scope of the disclosure or usefulness of the features described herein. In this example, system 600 may include a rack 610 and payload(s) 630.

The rack 610 may include a rack monitoring unit 611, power system 625, and main bus bar 634. The rack monitoring unit may include one or more processors 640, memory 642, instructions 644, and data 646.

The processors 640 may include any type of conventional processors, such as commercially available microprocessors. Alternatively, the one or more processors may be an application specific integrated circuit ("ASIC") or other hardware-based processor. Although FIG. 6 functionally illustrates the processor, memory, and other elements of rack 610 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of rack 610. Accordingly, references to a processor or computing device will be understood to include references to a collection of processors or computing devices or memories that may or may not operate in parallel.

Memory 642 may store information that is accessible by the processors, including instructions 644 that may be executed by the processors 640. The memory 642 may be a type of memory operative to store information accessible by the processors 640, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 644 and data 646 are stored on different types of media.

Memory 642 may be retrieved, stored or modified by processors 640 in accordance with the instructions 644. For instance, although the present disclosure is not limited by a particular data structure, the data 646 may be stored in computer registers, in a relational database as a table having a plurality of different fields and records, XML documents, or flat files. The data 646 may also be formatted in a computer-readable format such as, but not limited to, binary values, ASCII or Unicode. By further way of example only, the data 646 may be stored as bitmaps comprised of pixels that are stored in compressed or uncompressed, or various image formats (e.g., JPEG), vector-based formats (e.g., SVG) or computer instructions for drawing graphics. Moreover, the data 646 may comprise information sufficient to identify the relevant information, such as numbers, descriptive text, proprietary codes, pointers, references to data stored in other memories (including other network locations) or information that is used by a function to calculate the relevant data.

The instructions 644 can be any set of instructions to be executed directly, such as machine code, or indirectly, such as scripts, by the processor 640. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The processors 640 may include a power consumption monitor that monitors the power consumption of the one or more payloads 630. The power consumption monitor may detect whether the power consumption of the payloads 630 exceeds a threshold power consumption. When the power consumption monitor detects that the power consumption of the payloads exceeds the threshold for a predetermined period of time, the processors 640 in conjunction with power system 625 may send a throttling signal to the payloads 630 via main bus bar 634. The throttling signal may be, for example, a decrease in voltage. For example, processor 640 may execute instructions 644 to decrease the output voltage of power system 625. The decreased output voltage may be transmitted to payloads 630 via main bus bar 634. According to some examples, a decreased output voltage for a predetermined period of time may be a throttling signal to the payloads. According to some examples, the throttling signal may be detected by a comparator 666 and transmitted to a sequencer 664 of payload 630.

Power system 625 may include one or more rectifiers 624 and battery backup 609. The rectifiers 624 may be connected to the main bus bar 634 and supply voltage and, therefore, power to the payloads 630. The battery backup 609 may include on or more battery units, such as battery units 513, as shown in FIG. 5A. The battery backup 609 may provide power in the case of a power event, such as a power outage.

Figure 7:
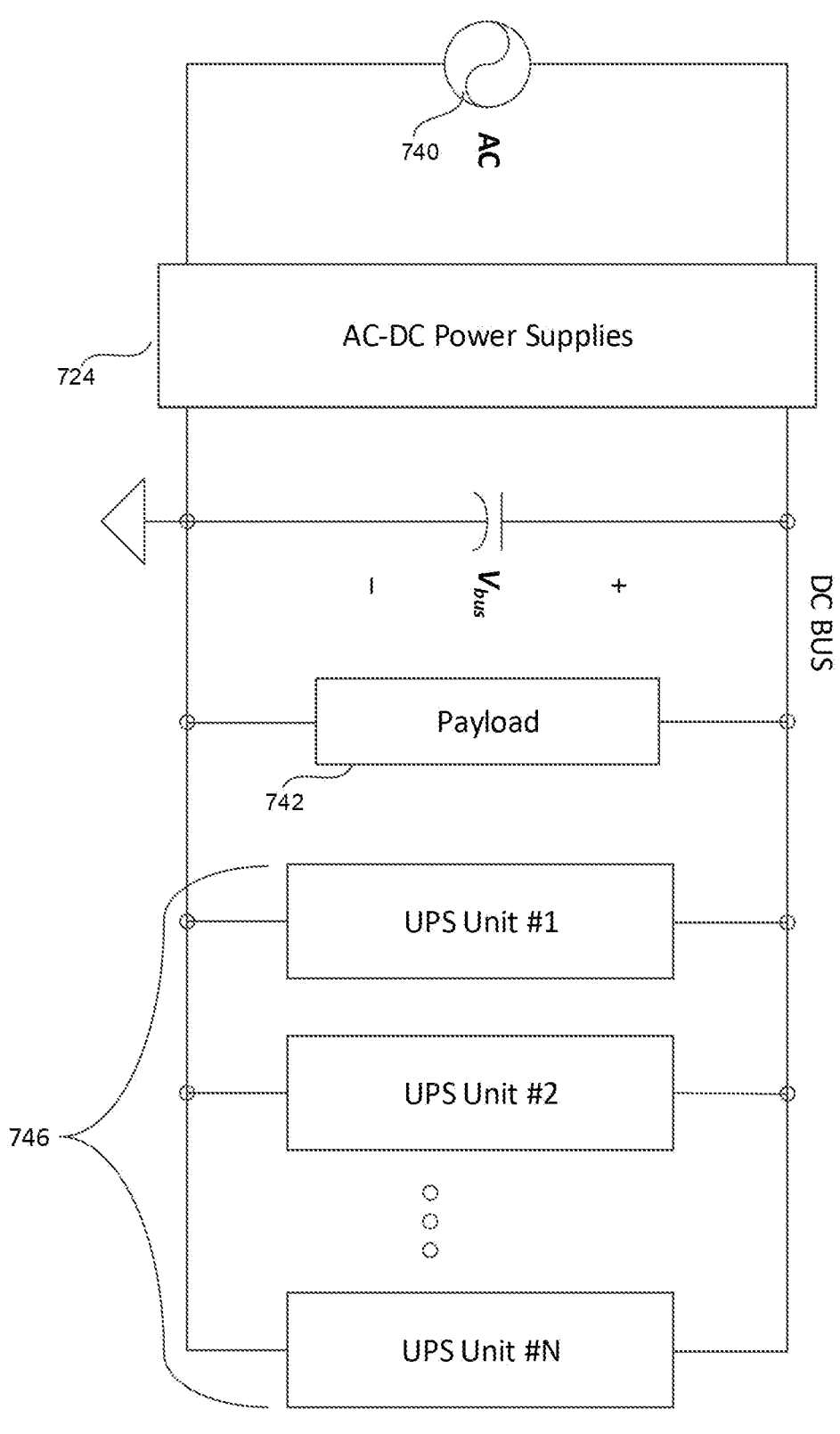
FIG. 7 is a block diagram of an example system in accordance with aspects of the disclosure.

FIG. 7 is an example of a power architecture for power system 625. An AC power source 740 may be connected to the rectifiers 624. In this example, the rectifiers 624 may be AC to DC rectifiers 724, as shown in FIG. 7. The rectifiers 724 may be connected to the main bus bar 634 and supply power to a payload, such as payloads 550-552 shown in FIG. 5A. The payload 742 may be connected in parallel to a plurality of uninterruptible power supply units (UPS) 746. The UPSs 746 may correspond to the battery units 513 disposed on shelves 514a-514c, shown in FIG. 5A. According to some examples, UPSs 746 may make up the battery backup supply 509, 609.

Returning to FIG. 6, the main bus bar 634 may provide power and data from the rack 610 to the payloads 630.

Additionally or alternatively, the main bus bar 634 may provide data from the payloads 630 to the rack 610.

Loads 630 may include one or more processors 650, memory 652, instructions 654, and data 656 that are substantially similar to those described herein with respect to rack 610. Payloads 630 may further include a power supply 660, controller 662, sequencer 664, comparator 666, and offset 668.

The processors 650 may include an input voltage monitor that monitors the input voltage from the power system 625 of rack 610. The input voltage monitor may monitor the input voltage to detect a reduction in voltage. A reduction in voltage to a threshold period of time may be a throttling signal. For example, if the rack monitoring unit 611 detects the power consumption of the payloads 630 has exceeded threshold power consumption for the threshold period of time, the output voltage of the power system 625 may be reduced. In an example where the default output voltage of the power system 625 is 54.5V when there is no payload from the payloads 630 and 53.5V when there is a full payload from the payloads 630, the output voltage of the power system 625 may be reduced to 52 volts. The processors 650 of payload 630 may detect the input voltage has dropped to 52V, within a tolerance. The processors 650 of the oad may determine that the drop in input voltage is a throttling signal.

The comparator 666 may detect the throttling signal and transmit the throttling signal to the sequencer 664 in payload 630. In some examples, by transmitting the throttling signal to the sequencer, a delay may be added before throttling power consumption. For example, the sequencer may delay throttling power consumption by the payload by a threshold period of time. Delaying throttling power consumption of the payload by the threshold period of time may provide for the rectifiers to reestablish power, for the power consumption to normalize on its own, or the like before ever throttling power consumption.

According to some examples, the sequencer 664 may be configured to add a delay before throttling power consumption of payload 630. For example, the sequencer 664 may delay throttling power consumption by a threshold period of time to allow for the rectifiers 624 to reestablish power, for power consumption to normalize on its own, or the like before the payload 630 ever throttles power consumption.

In some examples, the sequencer 664 may latch the throttling signal. Latching the throttling signal may cause the throttling signal to be active for a predetermined period of time, e.g., a latch period. The latch period may remain until the predetermined period of time is over or another control signal allows the latched throttling signal to change.

The offset function 668 may determine the throttling offset. The throttling offset may be used to add a present voltage to the voltage sense input of the controller 662.

The controller 662 may be configured to receive the throttling offset and the latch period. The controller may be, in some examples, a PWM controller. The controller 662 may adjust the output, e.g., PWM, to throttle the power consumption of the payload. The controller 662 may adjust the output based on the throttling offset and the latch period. For example, the throttling offset may cause the controller 662 to determine that the payload 630 is consuming more power than the payload 630 actually is.

Figure 8:
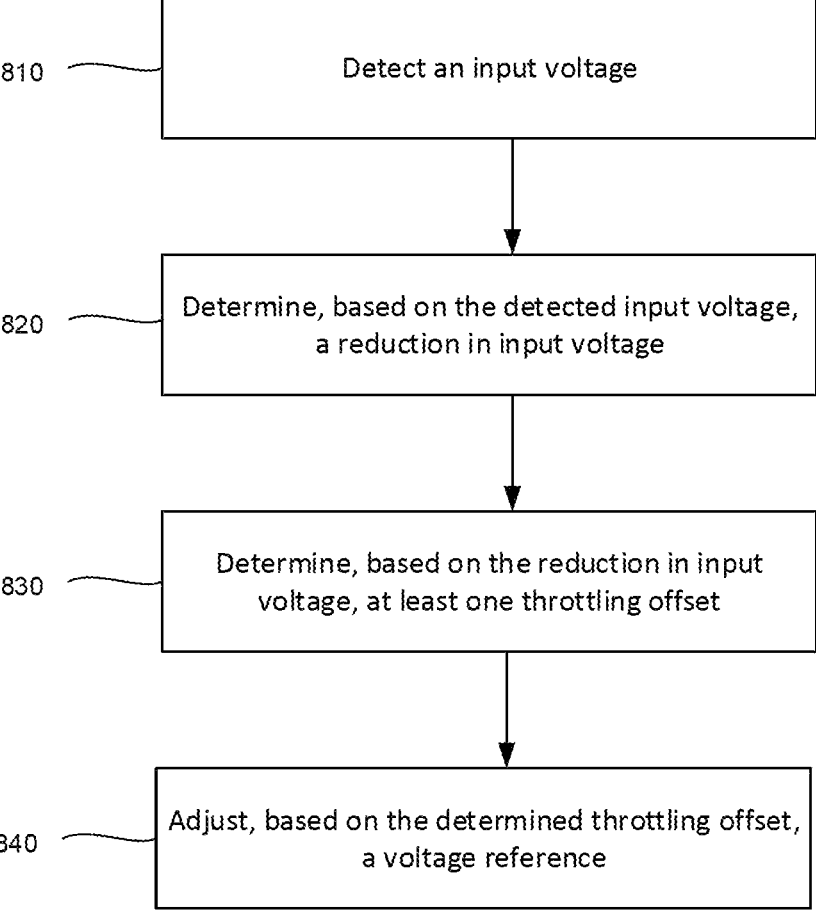
FIG. 8 is a flow diagram for an example method of delaying throttling power consumption in accordance with aspects of the disclosure.

FIG. 8 illustrates an example method for delaying throttling power consumption. The following operations do not have to be performed in the precise order described below. Rather, various operations can be handled in a different order or simultaneously, and operations may be added or omitted.

In block 810, an input voltage may be detected by a first payload. The first payload may be in communication with a rack configured to output voltage to the first payload.

In block 820, a reduction in input voltage may be determined by one or more processors of the first payload. The reduction in input voltage may be determined based on the detected input voltage. According to some examples, the reduction in input voltage may correspond to a throttling signal. The throttling signal may be transmitted to a software control loop.

According to some examples, power throttling may be latched for a latch period. The latch period may be based on a power supply of the rack. In some examples, the latch period may correspond to a predetermined period of time.

In block 830, at least one throttling offset may be determined based on the reduction in input voltage. The at least one throttling offset may be determined by a sequencer. In such an example, one of the at least one throttling offset is selected. According to some examples, the throttling offset may be determined by a voltage divider.

In block 840, a voltage reference may be adjusted based on the throttling offset. Adjusting the reference voltage may include, for example, decreasing power consumption of the first payload. According to some examples, the voltage reference may be monitored by a controller. The controller may be a PWM controller. In some examples, the power consumption may be throttled based on the reference voltage.

Adjusting the reference voltage input to the controller may allow for the payload to respond to the throttling signal in the order of milliseconds, rather than seconds if the reference voltage was adjusted in the software of the payload. Using the hardware components that are already pre-existing within the payload, a control loop can be created, without adding additional components. The control loop created by the hardware component within the payload may provide for a fast control loop, such as a control loop capable of responding to the throttling signal with a response time on the order of milliseconds.

In some examples, by adjusting the voltage reference based on the throttling offset, the power consumption of the payload may be reduced thereby extending the amount of time the payload can continue to operate on the battery backup, instead of the rectifiers. This may allow for the payloads to continue operating without disruption until power is restored. In some examples, this may allow for the payload to backup data or function before shutting down once the battery backup is depleted.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:

detecting, by one or more processors of a first payload, an input voltage;

detecting, by the one or more processors based on the detected input voltage, a reduction in the input voltage;

determining, by the one or more processors based on the reduction in the input voltage, at least one throttling offset;

adjusting, by the one or more processors, by the throttling offset, a voltage reference of a controller of the first payload; and latching, by the one or more processors, power throttling for a latch period, wherein the latch period is based on a power supply of a rack providing the input voltage to the first payload and corresponds to a predetermined period of time.

2. The method of claim 1, wherein when adjusting the voltage reference, the method further comprises decreasing, by the one or more processors, power consumption of the first payload.

3. The method of claim 1, wherein the at least one throttling offset is determined by a sequencer.

4. The method of claim 3, further comprising selecting, by the one or more processors, one of the at least one throttling offset.

5. The method of claim 1, wherein the at least one throttling offset is determined by a voltage divider.

6. The method of claim 1, wherein the reduction in input voltage corresponds to a throttling signal.

7. The method of claim 6, further comprising transmitting, by the one or more processors, the throttling signal to a software control loop.

8. The method of claim 1, wherein the voltage reference is monitored by a digital controller or a pulse-width modulator controller.

9. The method of claim 1, further comprising throttling, by the one or more processors based on the voltage reference, power consumption of the first payload.

10. The method of claim 1, wherein during latching the power throttling, in response to a power event, the power available to the first payload is sustained for at least the predetermined period of time so the first payload has sufficient time to backup data before shutting down.

11. A system, comprising:

one or more processors, the one or more processors configured to:

detect an input voltage provided to a payload;

detect, based on the input voltage, a reduction in the input voltage;

determine, based on the reduction in the input voltage, a throttling offset;

adjust, by the throttling offset, a voltage reference of a controller of the payload; and latch power throttling for a latch period, wherein the latch period is based on a power supply of a rack providing the input voltage to the payload and corresponds to a predetermined period of time.

12. The system of claim 11, wherein:

the one or more processors are further configured to determine, based on the power supply, the latch period.

13. The system of claim 12, wherein latching power throttling for the latch period reduces power used by the payload.

14. The system of claim 11, wherein when adjusting the voltage reference, the one or more processors are further configured to decrease the power consumption of the payload.

15. The system of claim 11, further comprising a software control loop, wherein the one or more processors are further configured to transmit the throttling offset to the software control loop.

16. The system of claim 11, wherein the controller includes a power management bus.

17. One or more non-transitory computer-readable storage media encoding instructions that, when executed by one or more processors of a payload, cause the one or more processors to perform operations comprising:

detecting an input voltage;

detecting a reduction in the input voltage;

determining, based on the reduction in the input voltage, at least one throttling offset;

adjusting, by the throttling offset, a voltage reference of a controller of the payload, and latching power throttling for a latch period, wherein the latch period is based on a power supply of a rack providing the input voltage to the payload and corresponds to a predetermined period of time.

* * * * *